United States Patent [19]

Vecsey et al.

[11] Patent Number: 4,783,306

[45] Date of Patent: Nov. 8, 1988

[54] METHOD AND DEVICE FOR PASSIVE TRANSFER OF HEAT FROM NUCLEAR REACTORS TO A PUBLIC UTILITY NETWORK, WITH AUTOMATIC REGULATION OF REACTOR POWER AND AUTOMATIC EMERGENCY SHUTDOWN AND SWITCHOVER TO EMERGENCY COOLING

[76] Inventors: Georg Vecsey, Haselweg 7, CH-5200 Windisch; Pal G. Doroszlai, Hirschengasse 21, CH-5416 Kirchdorf, both of Switzerland

[21] Appl. No.: 870,280

[22] PCT Filed: Aug. 23, 1985

[86] PCT No.: PCT/CH85/00123

§ 371 Date: May 5, 1986

§ 102(e) Date: May 5, 1986

[87] PCT Pub. No.: WO86/01632

PCT Pub. Date: Mar. 13, 1986

[30] Foreign Application Priority Data

Sep. 5, 1984 [CH] Switzerland .................. 4247/84
Nov. 8, 1984 [CH] Switzerland .................. 5357/84
Dec. 21, 1984 [CH] Switzerland .................. 6093/84

[51] Int. Cl.⁴ .................. G21D 9/00; G21C 15/00
[52] U.S. Cl. .................. 376/213; 376/214; 376/262; 376/264; 376/272; 376/277; 376/282; 376/283; 376/299; 376/317; 376/328; 376/336; 376/370; 376/371; 376/406; 376/408
[58] Field of Search ............... 376/406, 408, 370, 371, 376/357, 282, 283, 317, 212, 213, 220, 403, 404, 328, 366, 298, 214, 262, 264, 272, 277, 299, 336

[56] References Cited

U.S. PATENT DOCUMENTS 3,840,431 10/1974 Devin et al. ................... 376/406
4,363,780 12/1982 Hannerz ....................... 376/282
4,526,742 7/1985 Hannerz ....................... 376/406

FOREIGN PATENT DOCUMENTS 1535507 7/1968 France ......................... 376/406

0071992 4/1985 Japan .......................... 376/406

OTHER PUBLICATIONS

"Pressurized Water Reactor Inherent Core Protection by Primary System Thermohydraulics", Babala et al, Nuclear Science and Engr., 3/85, pp. 400–410.
Nuclear Europe, "PIUS Reactor", p. 30, 12/1984.
J. Lerner, "Low-Temperature Reactors for Space Heating", I.E.E.E. Spectrum, vol. 21, No. 2, [1984], pp. 50–55.
J. Kuusi, "Technische und Wirtschaftliche Probleme, Forschungsarbeit und Pläne für die Anwendung von Wärmereaktoren für Heizzwecke in Finland", Kernenergie, vol. 25, No. 1, [1982], pp. 14–18.

Primary Examiner—Deborah L. Kyle
Assistant Examiner—Daniel Wasil
Attorney, Agent, or Firm—Browdy and Neimark

[57] ABSTRACT

A pressurized water nuclear reactor has a reactor vessel arranged in a pool, which is filled with a neutron absorbing liquid, for example borated water. The reactor vessel is closed except for tubes connecting it with a tray above it. The coolant in the circuit rises from the vessel to the tray, gives up its heat by flashing, and flows back to the bottom of the vessel, driven by natural circulation. The tray is separated from the pool by a vapor-filled bell, which surrounds it. In the bell the vapor gives up its useful heat to a condenser. The relatively low boron content of the cooling circuit, compared to the pool, is achieved by continuous dilution of the condensate from vapor additionally generated out of the pool water. The dilution process is an equilibrium with continuous inflow of the pool water. The inflow is automatically controlled by the pool level, which rises when the pool water is pressed out from below the bell by overproduction of vapor. Shut down occurs whenever the sinking water level below the bell reaches the turning point of an elbow pipe, and consequentially most of the vapor escapes from below the bell, allowing the tray to be flooded by the pool water. After shutdown, the decay heat is transferred from the core to the pool by natural circulation.

29 Claims, 5 Drawing Sheets

METHOD AND DEVICE FOR PASSIVE TRANSFER OF HEAT FROM NUCLEAR REACTORS TO A PUBLIC UTILITY NETWORK, WITH AUTOMATIC REGULATION OF REACTOR POWER AND AUTOMATIC EMERGENCY SHUTDOWN AND SWITCHOVER TO EMERGENCY COOLING

FIELD OF THE INVENTION

The invention relates to a method for automatic transfer of the heat produced in a transportable nuclear reactor to the heat exchanger of the process water, with the power of the nuclear reactor being regulated by passive or automatic means. An important application is heat production for heating purposes in centralized remote-heating systems.

BACKGROUND OF THE INVENTION

Nuclear reactors with water-basin or pool cooling are known. The heat produced in the reactor is conducted by natural circulation to cooling elements, which transfer it to customers or to the environment. Some of these reactors have high, promptly negative neutron-absorption temperature coefficients. This means that removal of the neutron-absorbing control rods results in only a limited power excursion, since the temperature increase automatically limits the chain reaction.

Nuclear reactors in which the power is regulated by varying the content of neutron-absorbing solutions in the coolant, which also acts as a moderator, are known.

Nuclear reactors are known in which the spent fuel elements are individually manipulated and successively placed in transport containers, in which they assume an adequately subcritical configuration so that they can be transported.

Nuclear reactors are known in which the pressure drop via the reactor core, which is cooled by forced circulation, is in equilibrium with the hydrostatic negative pressure under a gas-filled bell in such a way that any disruption in cooling causes the gas to escape and the core to be flooded with neutron-absorbing water from the basin (i.e., pool).

SUMMARY OF THE INVENTION

The object of the invention, in a transportable reactor core, is to generate heat and transfer it to customers using purely passive components, in such a way as to exclude any possible sources of incorrect manipulation or component failure that could cause excess thermal capacity.

The device and method according to the invention is distinguished in that a nuclear reactor having a highly negative neutron-absorption temperature coefficient, located in a water basin (i.e., a pool with a cooling liquid such as water and a neutron absorber such as boron dissolved therein) to attain sufficiently low usable saturation temperatures, is cooled by natural convection of a partial quantity of water which is thermally insulated from the water basin. The heated water, rising far above the reactor core, evaporates because of the decreasing pressure of the still-remaining column of water. The steam component is separated from the remaining quantity of water in a condenser and transfers the useful heat to a further circulating system. The condensate, mixed with the remaining quantity of water, collects in a basin, and from there is returned to the reactor core. Further, the steam space about the condenser, communicating with the basin water in a bell that is open at the bottom, effects the pressure equilibrium between the partial water quantity of the primary loop and the basin (i.e., pool as above and in the following), such that overproduction or underproduction of steam leads to fluctuations in the level under the bell. By means of floats in automatically regulated valves these fluctuations vary the inflow of basin water containing dissolved neutron absorbers to the primary loop. Thereby the continuous decrease in the absorber content in the primary loop resulting from the supply of steam supplied partly by reactor heat and partly by supplementary electrical heating produced from the basin water and the condensate is compensated for; and that this continuous change, adapted to the thermal requirement, in the absorber content in the primary loop varies the reactivity, which in turn causes an adaptation of the temperature and of the reactor output that is determined by the negative neutron-absorption temperature coefficient.

During the regulating operations, the water level has a certain upper and lower fluctuation range. If the water level drops below the lower limit, this means that either the regulating system has failed or the disruption that is to be compensated for is too great. In such cases, the emergency cooling is activated, as a further provision of the method. According to the invention, this is accomplished by passive means, without any active intervention at all. A pipe leads downward from the upper part of the steam side of the condenser as far as an elbow pipe, which is below the lower limit of the regulating range and then from there leads upward and discharges via a distributor into the pool water. Above the distributor, another bell, open at the bottom, and containing a cooling coil, is provided (emergency cooler). This cooling coil, embodied as a thermal siphon, conducts the heat passively to the environment. Accordingly, during normal operation this emergency cooler is always filled with basin water, just like the piece of pipe between the pipe elbow and the emergency cooler container. If a disruption causes the water to drop below the pipe elbow, then the steam has free passage to the emergency cooler. The result is that the steam escapes from the condensate chamber, and basin water rises into the condenser. Here, it is mixed with primary cooling water and flows through the downpipe to the reactor. Since the water in the primary loop, during normal operation, is virtually pure, but the basin water contrarily has a relatively high concentration of dissolved neutron absorbers, supplying basin water has the effect not only of cooling but also of reliably shutting down the chain reactions and heat production in the reactor core.

In a further embodiment of the device and method, it is advantageous to provide an additional route for the basin water to reach the reactor core. This route should remain closed during normal operation, however, so that basin water is not admixed with the primary loop in an uncontrolled manner. This is accomplished in that a further connecting pipe between the basin and the plenum under the reactor leads upward first, into the steam space below the condenser. The pipe elbow in the steam space is ribbed on its outer surface. By means of the condensing steam, this ribbed surface supplies so much heat to the standing water in the pipe that the hydrostatic pressure is equalized there by means of steam formation. During normal operation, this cushion of steam in the pipe elbow separates the basin water from the primary loop. If emergency cooling is initiated, then the ribbed surface of the pipe elbow becomes flooded by the rising water level, and so the steam condenses. On the other hand, the resulting greater suction overcomes the barrier action of the steam cushion, thereby opening up the way for the basin water to reach the reactor core.

In emergency cooling operation, the heat production of the reactor is automatically interrupted by the delivery of neutron-absorbing water through the pipe system described. The thermal dissipation capacity of the emergency cooler is greater than the residual heat production of the reactor. Accordingly, during emergency cooling operation the water level in the condenser will rise, until the connecting pipe to the emergency cooler becomes flooded and the way for the quantity of steam that continues to be produced in this situation becomes blocked. The steam collects in the condenser, and so the water level drops again, until a state of equilibrium is attained. In the state of equilibrium, the residual heat is dissipated by heat losses in the condenser, on the one hand, and by natural circulation of the basin water through the reactor core on the other.

From the state of equilibrium, with dissipation of residual heat, normal operation is initiated once again, by purifying the absorber-containing water in the primary loop of the cooling circuit. This is accomplished by delivering steam generated from the basin water to the primary loop.

During the start-up process, the natural circulation of the primary loop is maintained by means of externally-powered electric heating and residual heat. Steam generated in this process causes the water level in the condenser below the bell to drop, until the natural circulation of the residual heat dissipation operation is interrupted and the separating cushion of steam in the delivery pipe of the basin water is also formed, thus separating the primary loop of the cooling circuit from the basin (i.e., pool). Steam additionally generated from basin water (coolant liquid with absorber) is delivered to the condenser.

To prevent excessive steam generation from resulting in emergency cooling operation again, the energy of the electric heating in the condenser must be dissipated once again. This cooling is initiated whenever the water level below the bell approaches an upper limit for water level regulation within the normal operating range. At this moment, in addition to the cooling, a fine regulation of the same water level is also initiated, which affects the power output. In this manner, the water level is stabilized above the normal regulating range. The status thereby attained is maintained until such time as the primary loop has been sufficiently purified of its boron content and the reactor begins to produce heat. The steam produced by the reactor heat causes the water level to drop into the regulating range, until the normal regulation assumes the task of adapting the reactor power output. The electrical output of the steam generator is automatically pulled back to a residual value by means of the fine regulation and this residual value continues to be maintained during normal operation.

In a further embodiment of the device and method, it is advantageous that the available heat in the condenser is not transferred directly to the process water at first, but instead is first transferred to the evaporator part of a thermal siphon embodied as a closed system. The condenser part of the system is then cooled by the process water, and thus a hermetically sealed intermediate loop is provided between the primary loop and the process water.

In a further embodiment of the device and method it is advantageous to embody the reactor core structurally in such a way that when it is lifted it spreads apart, becoming dismantled, with every other fuel element being replaced by neutron-absorbing spacer elements. The result is an adequately subcritical configuration that can be transported as an entity. The fuel elements of the reactor core are joined by means of hanger pipes and a cover lattice, alternating with supporting pipes and a bearing plate (i.e., bearer or supporting lattice). Both the hanger pipes and the supporting pipes are at least equally as long as the fuel elements and are provided with neutron-absorbing materials, so that if a bearer lattice approaches the bottom plate the reactor core is spread apart and the neutron-absorbing material is thrust between the fuel elements. If the bearer lattice and the cover plate are in such proximity, then half of the fuel elements of the reactor configuration are in an upper plane and the other half are in a lower plane. Neutron-absorbing material has thus been inserted between the fuel elements, and so a sufficiently subcritical configuration is brought about.

Those fuel elements that are connected to the cover lattice are held from below with the supporting lattice. This supporting lattice is joined with the cover lattice by spacer elements. In the same manner all the fuel elements that are joined to the bearing plate are held from above by a retaining lattice. These retaining lattices are joined on the one hand to the bearer plate by spacer elements and on the other hand, by retaining elements, to a lifting bell disposed above the cover plate.

If the entire configuration is lifted by means of the lifting bell or is set down on the bearing plate, then the cover plate and the bearer plate are, and remain, in proximity with one another. Contrarily, if the cover lattice is hung up and the lifting bell is supported, then the cover lattice is pulled to a distance away from the bearer plate, thereby producing the operational configuration. This configuration is destroyed in both cases if the lifting bell is raised or the cover lattice is lowered. In the concept of the invention, the supporting of the cover lattice is disrupted by a tripping mechanism, and the tripping is effected in the event of jolts, such as earthquakes. Also in the concept of the invention, excess steam that is produced is collected under the lifting bell, thereby raising it. Thus the invention provides that the reactor core is automatically changed into the sufficiently subcritical transporting configuration both in the event of jolts and if there is overproduction of steam.

In a further provision of the method, the reactor basin is protected at the top by an adequately protective, thick, laterally displaceable cover. Located in this cover is a niche that is open at the bottom and protected at the top. The reactor is raised to the lifting lattice, hanging in this niche, then is moved together with the cover to above an open transport container and let down into the container. The connections of the retaining elements between the lifting bell and the retaining lattice are undone and the lifting bell is removed. By sliding the protective cover once again, the closing cover of the transport container, which is retained in a second niche of the protective cover, is brought into position above the transport container, mounted on it, and made fast.

Accordingly, the reactor core is transported as an entity to some central location, where all the equipment for replacing the fuel or handling individual fuel elements is available.

The most important components of the apparatus according to the invention are as follows:

the primary loop of the cooling circuit, which is separated from the pool by a vapor filled shell, the operating pressure of which is determined by the level of the basin (pool) water located above the bell, and which as a thermal siphon automatically insures circulation and reactor cooling;

the self-purification of the primary loop by distilling the basin water, which has been positioned with soluble neutron absorbers, by means of vapor generated out of the pool water;

the regulation of reactor power by means of the pressure-equalizing liquid level, effected the supply of the neutron-absorbing basin (pool) water at the bottom of bell to the cooling circuit;

the connecting pipe between the bell with the condenser and the emergency cooler, which during normal operation functions as a steam siphon and remains closed because of the water level, but in the event of overproduction of steam causes flooding of the primary loop with neutron-absorbing basin water;

the pipe for supplying basin water to the reactor core, which is embodied as a siphon and during normal operation remains closed because of a steam cushion which is formed automatically;

externally-powered electric heating with a steam cutoff and level control, which effects the purification of the primary loop of the cooling circuit upon start-up;

the dismantleable reactor core, which as an entity forms an adequately subcritical configuration for the transport;

the provision for suspension of the dismantleable reactor core, which automatically puts the core into the adequately subcritical transport configuration in the event of either overproduction of steam or severe jolts; and the displaceable protective cover above the reactor basin, having a niche open at the bottom for receiving the reactor and for conveying it into the transport container.

BRIEF DESCRIPTION OF THE DRAWINGS

The invention will now be explained in detail in terms of an exemplary embodiment, taken in conjunction with the associated drawing. Shown are:

FIGS. 1a and 1b: FIG. 1a shows a first longitudinal section taken through a water pool or basin with a reactor and components of the primary loop of the cooling circuit and FIG. 2 shows a second longitudinal section with the connecting pipes of the emergency shutdown and cooling system located in the basin, both shown during normal operation;

DESCRIPTION OF PREFERRED EMBODIMENTS

Figure 1A:
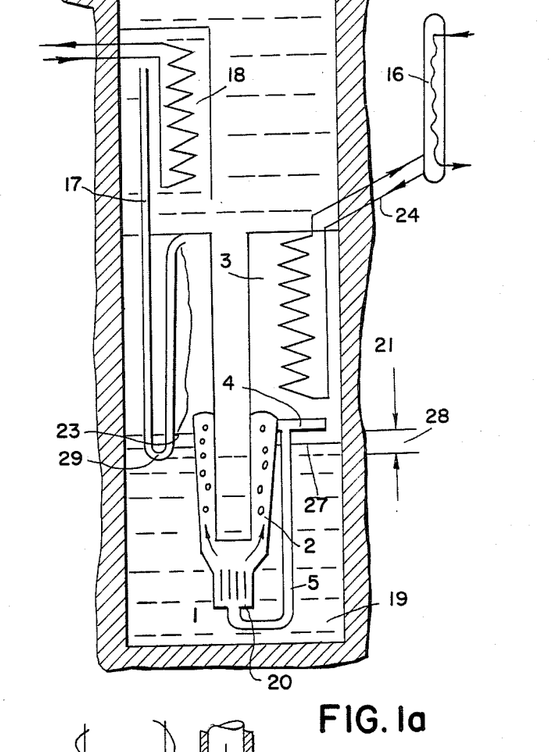
Figure 1B:
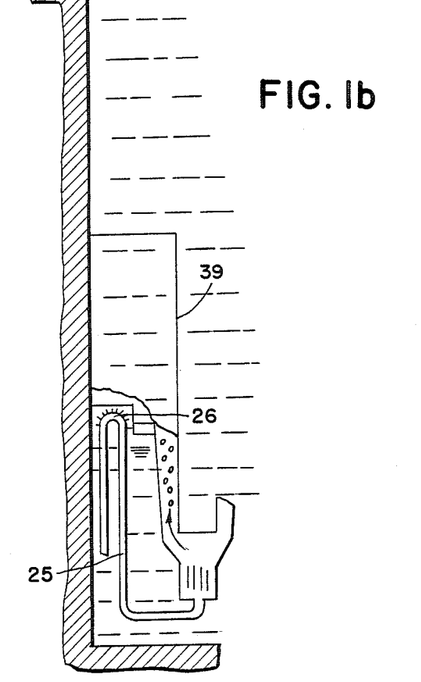

The reactor system, as in FIGS. 1a and 1b showing respectively the plenum 20 connected to the return pipe 5 for the condensate and the 25 for an emergency flow of the pool water with the neutron absorber, comprises a deep pool or basin 19, filled with water containing boron, with the nuclear reactor 1 lowered to its bottom. The cooling water rises out of the plenum 20, flows through the reactor core 1 and rises in the annular conduit 2. The dropping pressure of the water as it rises permits steam to form by flushing. At the upper end of the annular conduit, water and steam are separated. The steam rises into the condenser 3, where it gives up its useful heat. The water portion, and the condensate flowing downward, collect in the condensate container (i.e., tray) 4, from which a return pipe 5 leads back to the plenum 20 under the reactor core 1. The difference in specific gravity of the water/steam (two phases) mixture in the annular conduit 2, on the one hand, and the water in the return pipe, on the other, generates the drive for the coolant circulation. The pressure in the primary loop of the cooling circuit is equalized by means of the connection 21 with the water basin, the condenser thus forming a steam bell.

Figure 2:
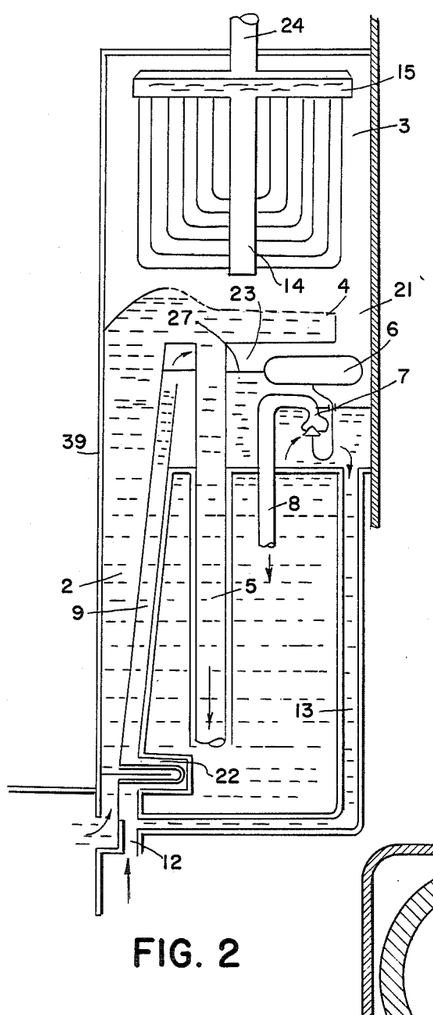
FIG. 2: a longitudinal section taken through the condenser of the primary loop, through the jacket flow for self-purification of the primary loop and for regulating power by means of the pressure-equalizing water level using basin water supplied to the primary loop.

The outer sheathing of the annular conduit 2 and of the reactor core 1 is embodied with double walls and insulated from the outside, as shown in FIG. 2. The space 9 between the two walls of the double wall is open at the bottom to the water basin. The heat from the annular conduit 2 that is given up to the interspace 9 in the heat exchanger 22 leads to the formation of steam. The resultant steam is supplied through the connection 21 to the condenser 3. If there is too much water present in the primary loop of the cooling circuit, this causes an overflow of the condensate container 4. The overflowing water leaves the primary loop via the connection 21. The boron content of this overflow is equivalent to the mean concentration of the primary loop. Since the steam which is additionally generated from the basin water is boron-free, while the overflow contains boron, the primary loop is purified continuously, and its boron content decreases continuously. This causes a rise in reactivity and an increase in the reactor power, until the higher temperatures of the reactor core stabilize the power via the negative neutron-absorbing temperature coefficient. Since steam delivery takes place continuously, the reactor power increases continuously, until the quantity of steam produced in the condenser can no longer be carried away. Through the connection 21, the overproduction of steam forces the water level down and out of the bell 23 located below this connection 21, until the float 6 drops as well and via the valve 7 and the connecting line 8 opens up the way for boron-containing basin water (pool water, pool liquid) to reach the plenum 20 under the reactor. The increase in the boron content lowers the reactivity and hence reduces the reactor power. In stationary operation, the supply of steam and the supply of water from the water basin to the primary loop remain in balance. Changes in the power demand lead to an adaptation of the quantity of steam condensing in the condenser 3. In such cases, the balance shifts in favor of either the quantity of steam supplied or the quantity of water, until the power produced has adapted to the demand.

Figure 3:
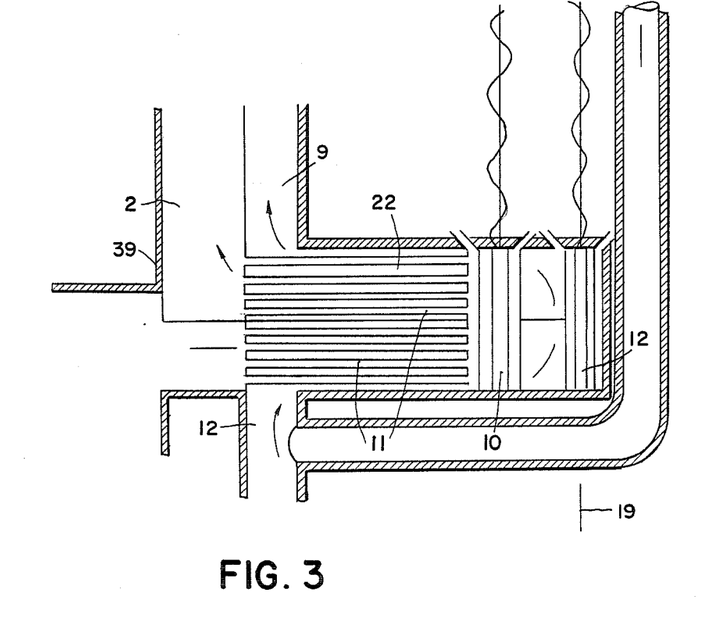
FIG. 3: a longitudinal section taken through the heat exchanger between the primary loop and the jacket flow, with the disposition of the electric heating for start-up operation.

Some details of the heat exchanger 22 between the rising hot water in the annular chamber 2 of the primary loop and the jacket flow in the double wall 9 of the annular chamber 2 are shown in FIG. 3. The water heated in the reactor core enters into the pipes 11 of the heat exchanger 22, is carried to the electric start-up heater 10, rises between the rods of this heater, and re-enters the pipes 11 of the heat exchanger 22, which carry it to the annular chamber 2. The electric heater 10 has the task of heating the primary loop and starting its circulation upon start-up. The boron-containing water flows from the inlet pipe 12, which is open to the water basin 19, and into the heat exchanger 22, in this case between the pipes 11 around the heater 10 to the further electric heater 10, rises between its rods, and is again carried around the heater 10 and between the pipes 11 of the heat exchanger 22 until it reaches the interspace 9, where it rises and flashes. The steam component of the jacket flow is separated from the water component in the bell chamber 23. The boron-containing water is returned through the connecting pipe 13 to the inlet pipe 10'. The electric heater 12 has the task of maintaining the jacket flow upon start-up and generating steam until such time as the primary loop is purified sufficiently and the reactor begins to produce heat. Both electric start-up heaters 10 and 10' are lowered into the corresponding openings of the heat exchanger 22 such that they can be removed from above. They are sealed off from the water basin by means of their weight.

The condenser 3, as shown in FIG. 2, comprises vertical pipes between a water collector 14 and a steam collector 15. In the vertical pipes, a water/steam mixture comes to be produced, which rises to the steam collector 15. The water component is returned from here to the water collector 14. The steam component is carried by the line 24 through the concrete wall of the water basin to the condenser 16, as shown in FIG. 1. It is the process water of the remote heating system that circulates in the U-shaped tubes of this conventional heat exchanger 16. The steam condensing on the outer surface of these pipes heats the process water. The condensate is returned to the steam collector 15, where it mixes with the water component.

All the component parts of the primary loop are thermally insulated from the basin water. To prevent the heat losses that nevertheless occur from causing excessive heating of the basin water, the rising, heated basin water is carried to the basin water cooler 18. The basin water cooler 18 is accommodated under a bell which is open at the bottom. Together with the cold-water content of the basin 19, it also functions as an emergency cooler. To this end, the steam siphon line 17 connects the upper part of the condenser 3 with the emergency cooler 18. Initially the connecting pipe 17 dips below the exposed surface of the water 27 underneath the bell 23.

The water level 27 in the space that is open toward the bottom and located underneath the bell 23 is kept within the regulating range 28 during normal operation by the power regulation of the reactor. The connecting pipe 17 dips below the lower limit of the regulating range 28, so that during normal operation of the pipe elbow 29 always remains submerged.

On the other hand, the plenum 20 underneath the reactor 1 communicates with the water basin 19 through a connecting pipe 25. This connecting pipe 25 initially rises into the steam space underneath the bell 23, to such a level that during normal operation the pipe elbow 26 always comes to be located above the upper limit of the regulating range 28 of the water level 27.

Overproduction of steam causes the water level 27 to drop and opens the way for the steam to pass through the connecting pipe 17. The steam escapes from the condenser 3 into the emergency cooler 18. Accordingly, the pressure in the condenser 3 drops from the static value, corresponding to the water level 27, to the much lower level that prevails in the emergency cooler 18. The result is a suction effect; the water level 27 rises, and the basin water flows through the connecting pipe 12 and through the equalizing opening 21 into the primary system.

The rising water level 27 submerges the pipe elbow 26, so that the steam cushion in this elbow 26 is made to disappear by condensing, on the one hand, and on the other hand its resistance is overcome by the suction, so that the direct route of the basin water through the connecting pipe 25 to the plenum 20 underneath the reactor becomes available. The inflowing basin water, containing boron, stops the production of heat in the reactor and additionally contributes to cooling. The remaining steam production, dictated by the residual-heat production of the reactor, condenses in the emergency cooler 18 until the water rising in the condenser 3 submerges the inlet opening of the connecting pipe 17. The state of equilibrium ensues. The residual heat of the nuclear reactor 1 is transmitted by the condensing steam onto the walls of the condenser 3 and from there is transmitted, as heat loss resulting from the incomplete insulation, to the basin water. At the same time, a portion of the quantity of heat is carried directly out of the primary loop by the natural circulation of the basin water. The basin water flows through the pipe 25 into the plenum 20 under the reactor 1, flows through and cools the reactor 1, rises in the diffusor 2 into the condenser 3 and exits from the primary loop through the pressure-equalizing openings 21, connecting pipes 13 and inlet pipes 12.

Figure 4:
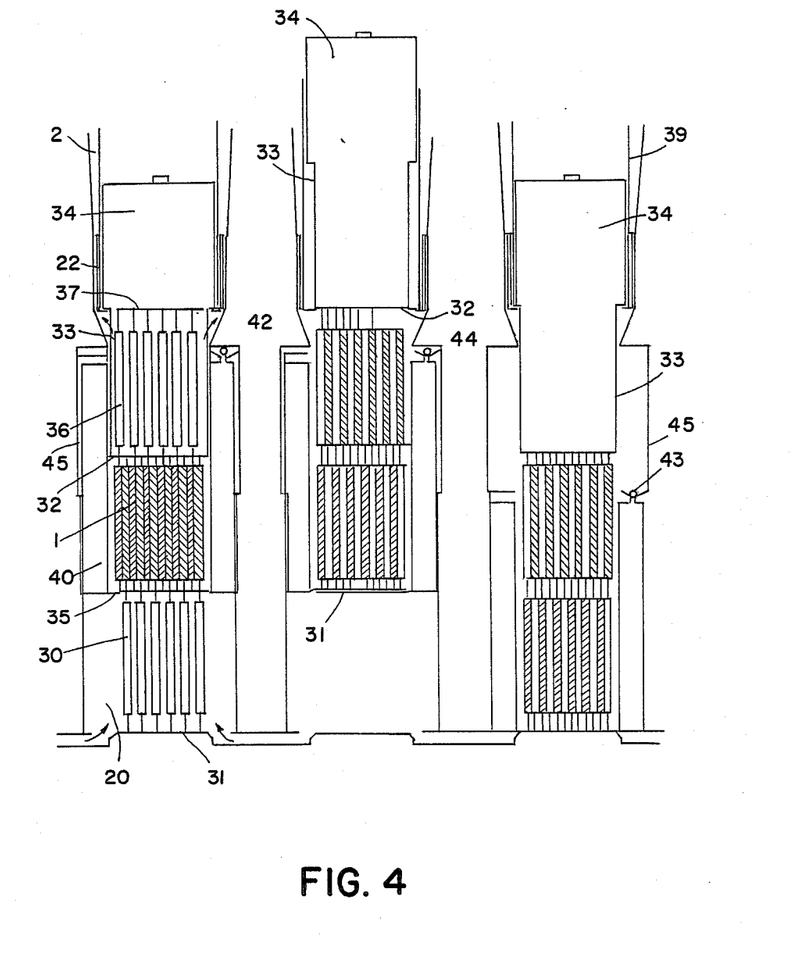
FIG. 4: a schematic longitudinal section taken through the reactor core and its suspension in the operating configuration, shown raised by the overproduction of steam (or for the purpose of transporting it) and lowered after tripping of the retaining means following a jolt.

The disposition of the reactor core is shown in FIG. 4. The cooling water of the primary loop, rising from the plenum 20 underneath the core, flows through the core 1 and the heat exchanger 22 and rises further in the annular chamber 2. Every other fuel element of the core 1 is joined at the bottom by means of supporting pipes 30 to the bottom plate 31. The same fuel elements are held at the top by the retaining lattice 32. The retaining lattice 32 is joined by the connecting pipe 33 to the lower edge of the lifting bell 34. The fuel elements of the core 1 that are located in between are held at the bottom by the supporting lattice 35 and at the top are joined by means of retaining pipes 36 to the cover lattice 37.

On the left in FIG. 4, the reactor core is shown in the working configuration. The lower edge of the lifting bell 34 is supported here on a support ring of the central guide pipe 39 (FIGS. 2 and 3). A rubber seal prevents mixing of the pool water and primary loop water at this point. The supporting lattice 35 rests on a support ring of an annular bell 40. The annular bell 40 supports the weight of half the reactor core by means of the charge of gas in it.

Figure 6:
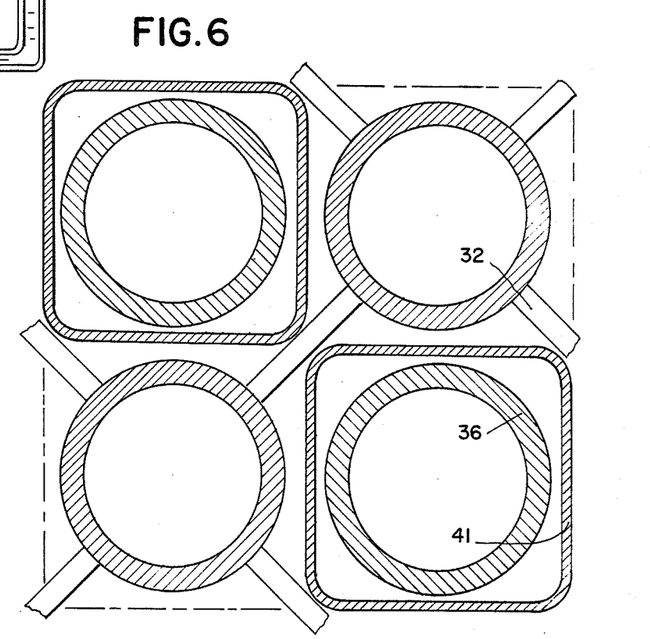
FIG. 6: a cross section taken through the supporting pipes with neutron-absorbing sheathing and with the supporting lattice moving in between them.

During normal operation, no steam is produced in the reactor core 1. Steam production begins only in the diffusor of the annular conduit 2. If steam should nevertheless be produced in the core 1 for any reason whatever, then it rises between the retaining pipes 36 and through the cover lattice 37 into the lifting bell 34. If enough steam is produced that the lifting bell 34 becomes filled, then the fuel elements joined to the lifting bell 34 are raised between the retaining pipes 36, as shown in the middle of FIG. 4. At the same time, the retaining pipes 30 shift in between the other fuel elements, that is, the ones remaining in their positions. The retaining pipes 30 and 36 are masked with boron steel sheathing 41 (FIG. 6).

When the lifting bell 34 rises, the retaining lattice 32 must slide through, in between the retaining pipes 36 that are masked with boron steel sheathing 41. This is shown in FIG. 6. The retaining pipes 30 slide through the supporting lattice 35 in the same way.

The annular bell 40 is open at the bottom. The gas charge is supplied through flexible connecting lines. At the upper end of the annular bell, a valve opening 42 is closed by a solid steel ball 34. In the event of severe jolts, this steel ball 43 rolls away from the valve opening 42, so that the gas charge escapes from the annular bell 40 and the bell, together with the fuel elements supported on it, sinks. Before the lower position shown on the left in FIG. 4 is reached as the bell sinks, the steel ball 43 is returned to its original position by the movable restoring means 44, which remains suspended on the edge of the sheathing cylinder 45, and closes the valve opening 42 once again.

Figure 5:
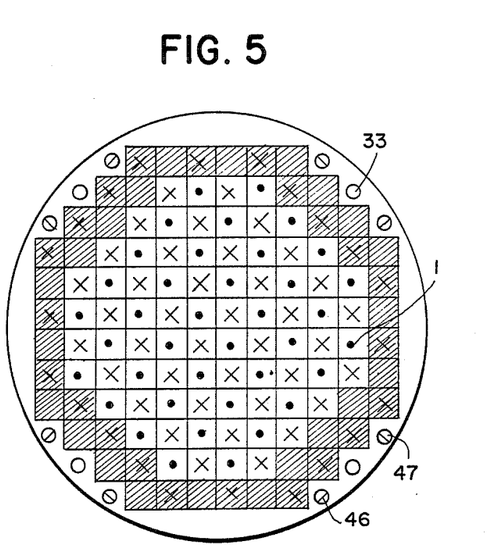
FIG. 5: a cross section through the reactor core in the operating configuration.
Figure 7:
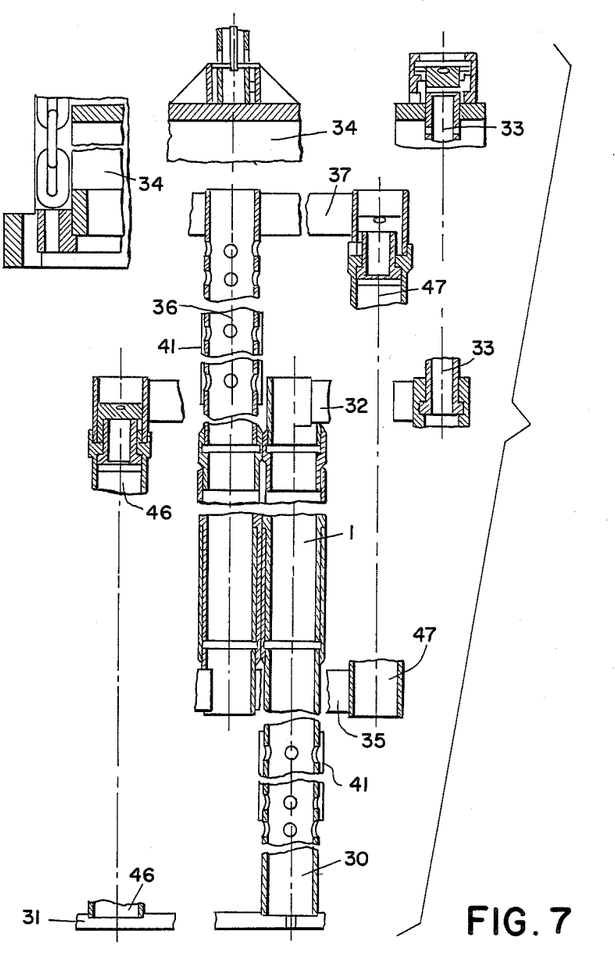
FIG. 7: a longitudinal section taken through the reactor core in the operating configuration with details of the construction.

The bottom plate 31 is joined to the retaining lattice 32 by the lower spacer pipes 46 (FIG. 5). In the same manner, the supporting lattice 35 is joined to the cover lattice 37 by the upper spacer pipes 47. The arrangement of the lower and upper spacer pipes 46 and 47 and of the connecting pipes 33 about the reactor core is shown in FIG. 5. Details of these connections are shown in FIG. 7.

Figure 8:
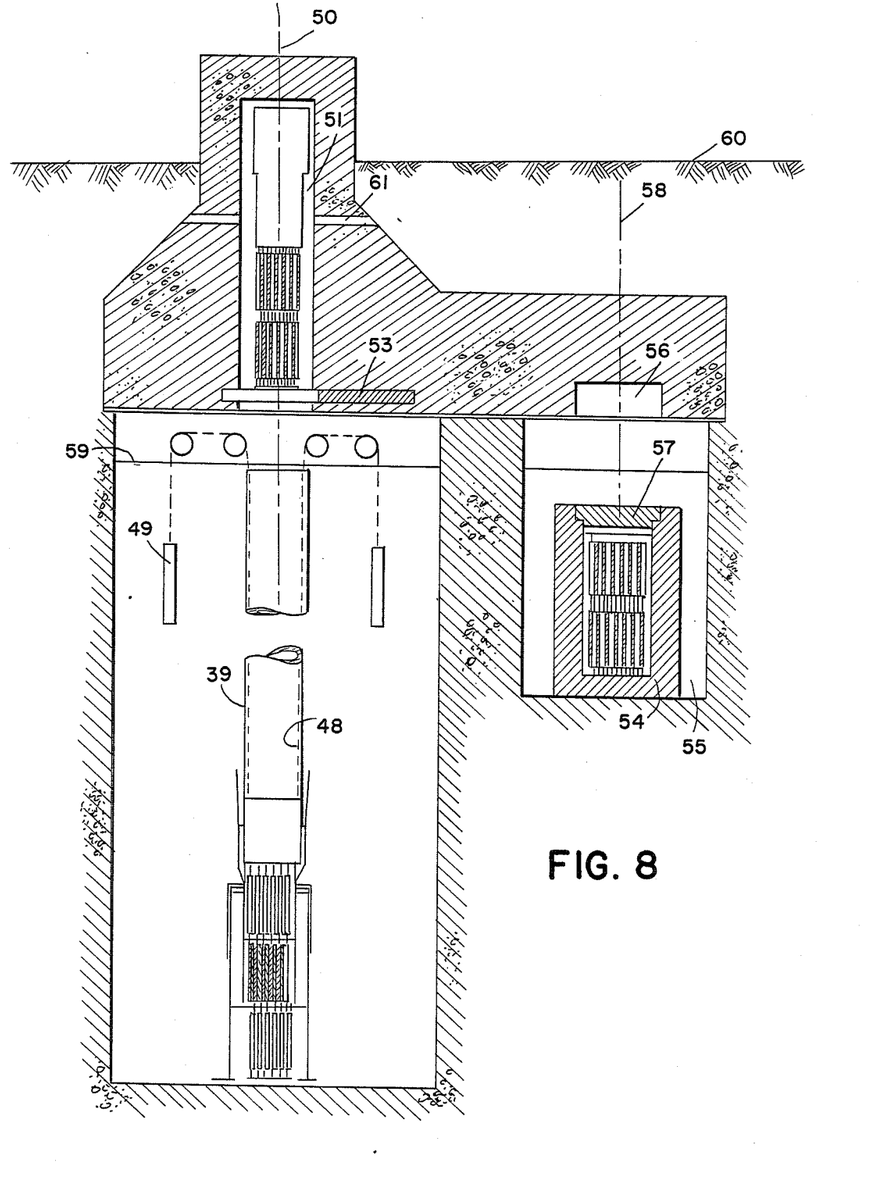
FIG. 8: a longitudinal section taken through the reactor with its lifting apparatus, protective cover and transport container.

FIG. 8 first shows the reactor in the working position with the chain hoist 48 and the counterweights 49, which facilitate the lifting operation. If the reactor is lifted, then the lifting bell 34 can be coupled with the hoisting tool 50 and the reactor can be moved further upward into the niche 51 of the protective cover 52. The reactor is secured in this position by the sliding gate 53. The protective cover 52 is slid laterally above the transport container 54, which is set down in the recess 55. After the reactor has been let down into the transport container 54, the lifting bell 34, along with the retaining pipes 33, is detached from the reactor and the protective cover 52 is slid once again, until the niche 56 containing the container lid 57 is in position above the transport container. The cover 57 is then placed by the hoisting tool 58 on the transport container 54 and fixed there.

During the process of loading the reactor, the coolant level is raised from the normal status 59 to the loading status 60. This enables cooling of the reactor by natural circulation through the openings 61 in the protective cover.

We claim:

1. A method for generating low-temperature heat from a nuclear reactor, said nuclear reactor being disposed in a basin of a liquid containing a neutron absorbing material, comprising the steps of cooling water in a primary cooling loop thermally isolated at least in part from said basin, to flow out of a plenum underneath a core of said reactor, through said reactor and into an ascending pipe, wherein decreasing hydrostatic pressure in the ascending pipe causes formation of steam, separating the steam from the water at the upper end of the ascending pipe and removing the heat content of the steam as useful heat in a condenser to form a condensate, collecting said condensate and any of said water in a condensate collecting basin and returning the mixture via a downpipe to the plenum underneath the reactor, in such a way that a difference in specific gravities of the liquid and steam in the ascending pipe and of the liquid and condensate in the downpipe maintains natural circulation of said primary cooling loop, and equalizing the pressure between the primary cooling system and the basin at a level of the condensate collecting basin in such a manner that, in the primary loop below this level to the plenum underneath the reactor, the hydrostatic pressure increases continuously, while above this level a constant condensation pressure prevails, wherein said level of said collecting condensate basin is free to vary.

2. The method of claim 1, wherein regulation of the reactor power is effected by variations in reactivity effected by varying the content of the neutron absorber dissolved in the cooling water, in that the change in reactivity is compensated for by a negative neutron-absorption temperature coefficient of the fuel elements in such a manner that when the temperature and power vary, a new equilibrium is established.

3. An apparatus for practicing the method of claim 1, comprising a connecting pipe from an upper part of a space where said steam is condensed by said condenser initially leading downward, below said level in said condensate collecting basin, and then back upward, where said connecting pipe discharges into a further basin of cold water, such that in the event of overproduction of steam the steam escapes upward through the lower pipe elbow, which normally is closed because it communicates with water, and condenses there, as a result of which the pressure in the condenser drops and cold basin water is aspirated into the primary loop by the rise of the equalizing level in the condenser, mixes there with the water of the primary loop and additionally, as emergency cooling, cools the reactor core and sharply reduces the reactivity in the reactor core by means of an increased content in dissolved neutron absorbers, as a result of which the generation of heat in the core is interrupted.

4. A method as defined by claim 3, wherein during the additional cooling operation which follows the overproduction of steam, water from the basin is delivered directly to the plenum underneath the nuclear reactor in such a manner that the delivery pipe initially rises, has an elbow that is ribbed on its outer surface, and then is extended downward to the plenum underneath the reactor core, and that the ribbed elbow extends to the steam space underneath the condenser, which prior to the initiation of the emergency cooling operation is always filled with steam, so that the steam condensing on the ribs heats up the pipe elbow, generating steam in its interior, which as a cushion of steam isolates the basin water from the water content o the primary loop until such time as the suction effect, after the initiation o the emergency cooling operation, overcomes its resistance and opens the way for the basin water to reach the reactor core, and that after the settling of the water level, which rises in the condenser as a consequence of the emergency cooling operation, and after a renewed closure of the communicating steam connecting pipe by submersion, an additional cooling of the reactor core by natural circulation is brought about, in that cold basin water continues to be delivered directly to the reactor core, and being heated rises in the diffuser, and emerges again from the primary loop through the pressure-equalizing connections and contributes to the dissipation of residual heat.

5. The method of claim 1, wherein steam is generated with electric heating and is delivered to the primary loop, so that the primary loop is heated up and circulated by the electrically generated steam, until the steam collecting in the condenser causes the water level in the primary loop to drop to such an extent that the natural circulation of the basin water through the reactor is interrupted, the cushion of steam forms in the direct delivery pipe for supplying the basin water to the reactor core and thus hinders the delivery of basin water to the primary loop until such time as the water content is purified of boron content, by the delivery of steam, to such an extent that the power generation in the nuclear reactor begins and the normal regulation assumes the task of adapting the power of the reactor.

6. The method of claim 5, wherein upon start-up the cooling of the condenser is started at the time when the decreasing water level approaches, from above, its level corresponding to normal operation, wherein the condenser cooling is virtually equivalent to the electrical output of the start-up steam generator and the fine regulation of the water level is effected by adaptation of the electrical output, until after sufficient purification of the primary loop the reactor beings to generate heat the water level that is continuing to drop causes the electrical output of the steam generator to drop to a value corresponding to normal operation as a result of the action of the fine regulation, and the normal reactor regulation assumes the task of adapting the power generated to the demand.

7. A method as defined by claim 2 wherein the increase in the reactor power by means of decreasing the content of dissolved neutron absorber in the primary loop is attained in that steam is generated from the basin water, which steam is delivered to the condenser part of the primary loop and condensed into water and thereby reduces the mean content of dissolved neutron absorber in the primary loop, and that the decrease in the reactor power is effected by means of increasing the content of neutron absorber by delivering basin water to the primary loop, wherein the basin water, during normal operation, always has a higher concentration of the dissolved neutron absorber than does the primary loop.

8. A method as defined in claim 7, wherein the generation of steam from the basin water is effected by means of heat from the reactor, in that heat from the primary loop is used for this purpose.

9. A method as defined by claim 7, wherein the delivery of the basin water to the primary loop is regulated automatically.

10. A method as defined by claim 9, wherein the regulation of the delivery of the basin water to the primary loop is effected in that at the water level in the pressure-equalizing connection of the primary loop, a float, which follows the changes in level of the surface of the water, opens the way for the basin water via a valve and connecting pipe to the primary loop, wherein the inflow takes place at a location of higher speed and correspondingly lower pressure.

11. A method as defined by claim 9 wherein a diaphragm translates the changes in the relative pressure between the steam space of the condenser and the surrounding water basin into the position of a valve, by which means the delivery of the basin water to the primary loop via a connection pipe is regulated.

12. A method as defined by claim 1, wherein a portion of the condenser in the mixing basins of the condensate, by means of direct after-cooling of the mixture, contributes to the transfer of heat from the primary loop to a secondary loop.

13. A method as defined by claim 1, wherein heat from the condenser portion of the primary loop is carried through an intermediate loop to the heat exchanger of the process water of the heat consumer.

14. A method as defined by claim 13, wherein the intermediate loop, embodied as a coupled secondary thermal siphon, effects the heat transfer automatically, in that the condenser of the primary loop is simultaneously constructed as the evaporator portion of the secondary thermal siphon and that the generated steam is carried to a heat exchanger located at a higher level, where it condenses and gives up its heat to the process water, whereupon the condensate flows back to the evaporator.

15. A method as defined by claim 1, wherein the lost heat from the basin water is automatically carried away by means of a thermal siphon and given up to the environment.

16. A method as defined by claim 1, wherein the coolant enters from a lower plenum, into the core zone, flows through the core and enters an upper plenum above the core zone, and that the fuel elements of the core are joined in alternation, through the upper plenum, with a cover plate and, through the lower plenum, with a bearer plate, respectively, in such a manner that if the bearer plate approaches the cover plate the fuel elements are thrust apart, and the connecting elements provided with neutron-absorbing materials are thrust in between the fuel elements, and as an entity from a sufficiently subcritical configuration.

17. A method as defined by claim 16, wherein the thrusting apart of the reactor core by lowering of the fuel elements joined to the upper cover plate is triggered by yielding of the retaining supports caused by jolts.

18. A method as defined by claim 17, wherein the retaining supports are embodied by gas-filled floats, so that upon the opening of corresponding valves, the gas charge escapes from the float, wherein the opening of the valves is automatically triggered by jolts, in that solid balls roll away from circular valve openings.

19. A method as defined by claim 16, wherein the thrusting apart of the reactor core is effected by raising the bell that is joined to the lower bearer plate, which occurs because excessively produced steam collects under this bell.

20. A method as defined by claim 16, wherein by raising the lower bearer plate, the reactor is brought into a sufficiently subcritical configuration for being transported, is lifted out of the basin and lowered into a transport container, and is transported to a central location, where the replacement of fuel elements is performed.

21. A method as defined by claim 20, wherein said basin is provided with a displaceable protective cover in which a niche that is accessible from below is located, and that the reactor is hoisted into this niche, slid laterally together with the protective cover to above the transport container and let down into this container, that the cover of the transport container is attached by one again sliding the protective cover out to the transport container, wherein the reactor core, in every phase of these operations, is completely protected, as provided by safety regulations, from external influences.

22. A device for providing heat using a nuclear reactor, with inherent safety, comprising
 a basin of coolant fluid having a neutron absorber distributed in said coolant fluid,
 a plenum located near the bottom of said basin and having a part of said coolant fluid in said basin therein, said nuclear reactor being located in said plenum, wherein said coolant fluid in said plenum is heated by said nuclear reactor when in an operating state,
 a conduit extending in said basin upward from said plenum with said nuclear reactor, wherein said coolant fluid in said plenum heated by said nuclear reactor rises and flashes,
 a condenser and bell means located in said coolant fluid in said basin, and connected to a top part of said conduit, wherein vapor of said coolant fluid rising and flashing in said conduit collects and condenses in said condenser and bell means, to define a respective level of said coolant fluid within said condenser and bell means with a space for said vapor to collect above said level of said coolant fluid in said condenser and bell means,
 a steam-siphon line including two vertical pipes connected at respective lower ends by an elbow, a first of said vertical pipes having an upper end that is open to a top portion of said space for said vapor in said condenser and bell means, and the second of said vertical pipes having a top end that is open to a further part of said basin,
 a condensate tray included in said condensing and bell means, for collecting a condensate of said vapor, said tray being connected by a respective pipe extending downwardly to recirculate said condensate to said plenum,
wherein:
 said heat being produced is obtained from said condensing and bell means via a respective condenser included therein, for said condensing of said vapor to said condensate;
 said coolant fluid is purified by said condensing of said vapor and said recirculating of said condensate to said plenum, via said pipe extending from said condensate tray to said plenum, for causing said reactor core to increase its rate of heat production as a result of the purification; and when said level in said bell falls below said elbow, said vapor above said level escapes to said further part of said basin, and coolant fluid with said neutron absorber enters said plenum from said basin, as a result of the escape by said vapor to said further part of said basin, to cause the production of heat by said nuclear reactor to substantially decrease, and thereby providing said using of said nuclear reactor to provide said heat with said inherent safety.

23. The device of claim 22, comprising
 a further connecting pipe, connecting from said plenum to said basin, and including a respective elbow located above said plenum and two vertical pipe portions extending downwardly from said elbow, a first of said vertical pipe portions connecting at a lower end thereof to said plenum and the second of said vertical pipe portions having a lower end that is open to said basin at a level below a minimum level of said level of said coolant fluid in said condensing and bell means,
 wherein, when said vapor escapes via said steam-siphon line, said coolant fluid with said neutron absorber in said basin enters said plenum via said further connecting pipe, to at least contributed to said substantial decrease in said production of heat by said nuclear reactor.

24. The device of claim 23, said condensing and bell means providing a space within which said elbow of said further connecting pipe connecting said plenum to said coolant fluid with neutron absorbers in said basin extends above a normal operating level of said level of said coolant fluid in said condensing and bell means, wherein:
 while said level of said coolant fluid in said condensing and bell means is below said elbow of said further connecting pipe connecting said plenum to said coolant fluid in said basin, vapor of said coolant fluid in said further connecting pipe acts to prevent said coolant fluid from flowing therein between said plenum and said basin; and
 when said level of said coolant fluid in said condensing and bell means rises up to and above said elbow, said vapor collected in said elbow of said further connecting pipe condenses as a result of heat exchange with said coolant fluid surrounding said elbow, to stop said acting to prevent flow coolant fluid in said further connecting pipe.

25. The device of claim 22, comprising a float floating on said level of said coolant fluid in said condensing and bell means, and
 a connecting line with a valve operatively connected to said float, said connecting line connecting between said valve and said plenum,
 wherein said valve is opened as a result of said level in said condensing and bell means dropping below a predetermined level, thus allowing said coolant fluid in said condensing and bell means to be circulated via said valve and connecting line to said plenum for reducing the rate of said production of heat by said nuclear reactor, thereby contributing to said inherent safety.

26. The device of claim 22, comprising
 a double wall for thermal insulation between said basin and said coolant fluid in said condensing and bell means and in said pipe connecting said condensate tray with said plenum, supplemental vapor forming means for circulating said coolant fluid below said level in said condensing and bell means for being heated by said coolant fluid that is heated by said nuclear reactor and rises in said conduit, including for circulating along a heat conducting single wall of said conduit which extends along said conduit, said double wall also insulating the coolant fluid in said supplemental vapor forming means from the coolant fluid in said basin, wherein supplemental vapor is provided by the heating of the coolant fluid in said supplemental vapor forming means by said coolant fluid heated by said nuclear reactor that rises in said conduit, said supplemental vapor being also collected above said level in said condensing and bell means.

27. The device of claim 26, wherein said coolant fluid being circulated by said supplemental vapor forming means is circulated via a respective path connecting to said plenum that is open in the vicinity of said plenum to the coolant fluid in said basin.

28. The device of claim 22, comprising an auxiliary heating means for initiating operation for providing said heat using said nuclear reactor, wherein said auxiliary heating means initially heats said coolant fluid in said plenum for causing it to rise and flash in said conduit to cause said vapor to be collected in said condensing and bell means to bring said level of coolant fluid therein to within a predetermined operating range, and to initiate said operating state of said nuclear reactor.

29. A device for providing heat using a nuclear reactor, with inherent safety, comprising a basin of coolant fluid having a neutron absorber distributed in said coolant fluid, a plenum located near the bottom of said basin and having a part of said coolant fluid of said basin therein, said nuclear reactor being located in said plenum, wherein said coolant fluid that is in said plenum is heated by said nuclear reactor when in an operating state, the amount of heating provided by said nuclear rector when in said operating state depending on the amount of said neutron absorber distributed in said coolant fluid being heated, a conduit extending in said basin upward from said plenum with said nuclear reactor, wherein said coolant fluid of said basin in said plenum is heated by said nuclear reactor and rises and flashes in said conduit, a condenser and bell means located in said coolant fluid in said basin, and connected to a top end of said conduit, wherein vapor of said coolant fluid rising and flashing in said conduit collects and condenses in said condenser and bell means, to define a respective level of said coolant fluid within said condenser and bell means with a space for said vapor to collect above said level of said coolant fluid in said condenser and bell means, a condensate tray included in said condensing and bell means, for collecting a condensate of said vapor, said tray being connected by a respective pipe extending downwardly to recirculate said condensate to said plenum, a connecting pipe, connecting from said plenum to said basin, and including a respective elbow located above said plenum and two vertical pipe portions extending downwardly from said elbow, a bottom end of a first of said vertical pipe portions connecting to said plenum and a bottom end of the second of said vertical pipe portions being open to said basin at a level below a minimum level of said level of said coolant fluid in said condensing and bell means, and said condensing and bell means providing a space within which said elbow of said connecting pipe connecting said plenum to said coolant fluid with said neutron absorbers in said basin extends above a normal operating level of said level of said coolant fluid in said condensing and bell means, wherein:

while said level of said coolant fluid in said condensing and bell means is below said elbow of said connecting pipe connecting said plenum to said coolant fluid in said basin, vapor of said coolant fluid in said connecting pipe acts against said coolant fluid flowing therein between said plenum and said basin;

when said level of said coolant fluid in said condensing and bell means rises up to and above said elbow, said vapor collected in said elbow of said connecting pipe condenses as a result of heat exchange to said coolant fluid cooling said elbow, to stop said acting to prevent flow of coolant fluid in said connecting pipe;

said heat being produced is obtained from said condensing and bell means via a respective condenser included therein, for providing said condensing of said vapor to said condensate; and said fluid is purified by said condensing of said vapor and said recirculating of said condensate to said plenum, via said pipe extending from said condensate tray to said plenum, for causing said reactor core to increase its rate of heat production as a result of the purification.

* * * * *